Patented June 2, 1953

2,640,820

UNITED STATES PATENT OFFICE 2,640,820

PRODUCTION OF WATER-SOLUBLE RESIN SULPHONATES

Arthur S. Teot and Glenn C. Wiggins, Midland, Mich., assignors to The Dow Chemical Company, Midland, Mich., a corporation of Delaware No Drawing. Application June 11, 1951, Serial No. 231,050

9 Claims. (Cl. 260—79.3)

This invention concerns an improved method for sulphonating alkenyl aromatic resins, particularly polystyrene, to produce corresponding resin sulphonates which are soluble in water.

By "alkenyl aromatic resins" is meant solid, benzene-soluble polymers and copolymers of vinylidene compounds, which polymeric materials contain, in chemically combined form, 50 per cent by weight or more of at least one alkenyl aromatic compound having the general formula:

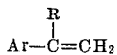

wherein Ar represents a monovalent aromatic radical and R represents hydrogen or a methyl radical. Examples of alkenyl aromatic resins which may be sulphonated in accordance with the invention are the solid homopolymers of styrene, alpha-methylstyrene, ar-chlorostyrene, ar-vinyltoluene, and ar-ethyl-vinylbenzene; copolymers of two or more of such alkenyl aromatic compounds, e. g. copolymers of styrene and vinyltoluene, or of styrene and alpha-methylstyrene, etc.; and copolymers of one or more of the alkenyl aromatic compounds with minor amounts of other vinylidene compounds such as amylene, diisobutylene, or 1,3-butadiene, etc.

Polystyrene and other alkenyl aromatic resins have heretofore been sulphonated by reaction with usual sulphonating agents such as sulphuric acid, fuming sulphuric acid, or chlorosulphonic acid, etc., both by direct reaction of a sulphonating agent with the solid resin and by gradually adding fuming sulphuric acid or chlorosulphonic acid to solutions of 10 per cent by weight or more of the resins in solvents such as carbon tetrachloride or chloroform. Although water-insoluble resin sulphonates may readily be made by such methods, the latter are not well-adapted to the production of water-soluble resin sulphonates of good quality or purity.

Baer, in U. S. Patents Nos. 2,533,210 and 2,533,211 discloses that water-soluble polystyrene sulphonates may be made by reacting sulphur trioxide with dioxane, or with bis-(beta-chloroethyl) ether, in a solvent such as ethylene chloride to form a solution of a chemical complex of the sulphur trioxide with the dioxane, or the bis-(beta-chloroethyl) ether, and adding to the solution, with stirring, a solution of polystyrene in the same solvent. The patents teach that the sulphur trioxide complex is formed at temperatures between −10° and +10° C. and that the sulphonation reaction must be carried out at temperatures between −15° and 15° C. in order to obtain a satisfactory product. They also teach that the order of mixing may not be reversed from that stated above, since an addition of the sulphur trioxide complex to the polystyrene solution causes formation of a water-insoluble sulphonated polystyrene. The patents indicate that the proportion of solvent is not critical, provided sufficient solvent is present for easy handling of the reaction.

It is an object of this invention to provide an improved method for the production of water-soluble sulphonates of alkenyl aromatic resins, e. g. polystyrene, which avoids need for employment of certain of the starting materials, steps, and precautions during operation that are required in the above-mentioned patents. Other objects will be apparent from the following description of the invention.

We have discovered a method whereby sulphur trioxide may be reacted directly with the aforementioned alkenyl aromatic resins at room temperature or thereabout to obtain resin sulphonates that are soluble in water, e. g. to form true or colloidal solutions thereof. The method is simple, economical, and produces the water-soluble resin sulphonates in a form that is free, or nearly free, of water-insoluble impurities.

The method consists essentially in admixing from 0.8 to 3 molecular equivalents of sulphur trioxide with one equivalent of the alkenyl aromatic resin, while having the latter dissolved in a liquid carbon chloride, i. e. a perchlorinated hydrocarbon, such as carbon tetrachloride or tetrachloroethylene, and while maintaining the mixture at reaction temperatures between −20° and 45° C., preferably between 0° and 35° C., the combined weight of the sulphur trioxide and resin starting materials being such as to correspond to not more than 10, and usually from 1 to 5, per cent of the weight of the liquid carbon chloride employed as a reaction medium. During mixing of the starting materials, the reaction mixture is preferably stirred vigorously or otherwise agitated. The expression "one equivalent of the resin," as employed herein, pertains to an amount of the resin containing, in chemically combined form, a total of one molecular equivalent of one or more monomeric alkenyl aromatic compounds. For instance, it is the amount of polystyrene containing one molecular equivalent of chemically combined styrene.

It is important that the entire combination of the reaction conditions just stated be employed. For instance, it is important that a liquid carbon chloride, e. g. carbon tetrachloride or tetrachloroethylene, be employed as a medium for the reaction, since chlorinated hydrocarbons such as chloroform or ethylene chloride are readily reactive with sulphur trioxide and are therefore not well suited for use as the reaction medium. Employment of appreciably less than 0.8 molecular equivalent of sulphur trioxide per equivalent of the resin usually results in formation of a water-insoluble resin sulphonate, whereas employment of considerably more than 3, e. g. 5 or more, molecular equivalents of sulphur trioxide per equivalent of the resin usually results in formation of a dark colored gummy resin sulphonate. From 1 to 2 molecular equivalents of sulphur trioxide are preferably employed per equivalent of the resin. Use of the liquid carbon chloride in proportions smaller than abovestated often results in formation of a considerable amount of water-insoluble resin sulphonate, or in charring and discoloration of the product. Employment of reaction temperatures considerably lower than —20° C., or considerably higher than 45° C., often results in formation of resin sulphonates which are partially or entirely insoluble in water.

The sulphonation is usually carried out under substantially anhydrous conditions, but minor amounts of water, e. g. up to 50 or more parts by weight of water per million parts of the liquid carbon chloride employed as a reaction medium, may be tolerated in the reaction mixture. In other words, ordinary carbon tetrachloride or tetrachloroethylene, containing such minor amounts of dissolved water, may be used directly, without predrying, as a medium for the sulphonation reaction.

In practice, the alkenyl aromatic resin is dissolved in a portion, or all, of the liquid carbon chloride which is to be employed as a reaction medium and the sulphur trioxide, alone or dissolved in another portion of the medium, is admixed in the aforementioned proportions with the resin solution while maintaining the mixture at temperatures between —20° and 45° C., preferably between 0° and 35° C. The procedure and order of mixing the starting materials is not critical and may be varied. For instance, the sulphur trioxide may be in the form of a gas, a liquid, or a solution thereof in a liquid carbon chloride when fed into admixture with the resin solution. Also, streams of the sulphur trioxide and the resin solution may be fed into admixture with one another at rates corresponding to from 0.8 to 3 molecular equivalents of sulphur trioxide per equivalent weight of the resin, or the sulphur trioxide may be added gradually to a solution containing all of the resin that is to be sulphonated. In other words, the rate at which the reactants are admixed may be varied. It may be mentioned that during an operation of gradually adding sulphur trioxide to the resin solution, the latter increases in viscosity up to a point at which from 0.4 to 0.6 chemical equivalent, or thereabout, of sulphur trioxide has been added per equivalent weight of the resin and the viscosity decreases upon addition of further amounts of the sulphur trioxide. These changes in viscosity are believed due to a precipitation of sulphonated resin in the form of swollen particles during addition of early portions of the sulphur trioxide followed by further sulphonation, and resultant shrinkage, of the particles as additional sulphur trioxide is added. When separate streams of the sulphur trioxide and the solution of the resin reactant are caused to flow into admixture with one another in the proportions required by the invention, the resin sulphonate is formed and precipitated as the reactants come into contact with one another, and a large increase in viscosity of the reaction mixture as a whole is not observed. Regardless of the rate or order in which the reactants are admixed, the resin sulphonate product is obtained as individual granules, or particles, that may readily be separated from the liquor by filtration.

The solid resin sulphonates thus obtained are strongly acidic, i. e. they are water-soluble resin sulphonic acids. They may be converted, e. g. by treatment with alkalies, into salts thereof. The ammonium and alkali metal, e. g. sodium and potassium, salts of the resin sulphonates are water-soluble.

In general, the alkenyl aromatic sulphonates are obtained, by the method, as white or light-colored materials of good appearance.

It may be mentioned that either stabilized or unstabilized sulphur trioxide can satisfactorily be employed in the process of the invention. Sulfan-B, i. e. liquid sulphur trioxide containing a non-volatile stabilizer to prevent polymerization of the same, was used as the source of sulphur trioxide in all of the following examples. In certain of the examples the sulphur trioxide was vaporized, and thus freed of the stabilizer, prior to use as a sulphonating agent. In all of the other examples, the sulphonating agent was Sulfan-B, i. e. stabilized sulphur trioxide. Since the stabilizer has little, if any, effect on the action of sulphur trioxide in sulphonating alkenyl aromatic resins, the examples, themselves, refer to the sulphonating agent as being sulphur trioxide.

The examples describe a number of ways in which the invention has been practiced, but are not to be construed as limiting its scope.

EXAMPLE 1

A solution of 8 grams of sulphur trioxide in 100 cc. of carbon tetrachloride was added, with vigorous stirring, to a solution of 10.4 grams of polystyrene (having an average molecular weight of about 15,000 as determined by the well-known Staudinger viscosity method) in 200 cc. of carbon tetrachloride, while maintaining the mixture at room temperature or only slightly above. The reaction was carried out in an apparatus known as a Waring Blendor. The sulphur trioxide solution was added slowly until the reaction mixture turned brown, and thereafter at a rapid rate. The total time for the addition was about 3 minutes. The sulphur trioxide reacted very rapidly with the polystyrene to form a precipitate of sulphonated polystyrene in the form of small granules, or particles. Gaseous ammonia was bubbled through the resultant slurry of the sulphonated polystyrene. The product was then separated by filtration and dried. It was obtained as a powder, of light tan color, which was readily and completely soluble in water. One gram of the powder was dissolved in 19 grams of water. The solution was found to have a viscosity of 4.67 centistokes at 25° C. and a pH value of 3.75. In view of this pH value, it is evident that the sulphonated polystyrene was only partially neutralized by reaction with the ammonia, i. e. the ammonia-treated product contained free sulphonic acid radicals as well as ammonium sulphonate radicals. It may be mentioned that the principal purpose of treating a reaction mixture with ammonia, in this and the other examples, was to neutralize any sulphuric acid accompanying the sulphonated resin product and that the partial neutralization of the product itself was merely incidental.

EXAMPLE 2

A solution of 16 grams (0.2 mole) of sulphur trioxide in 200 cc. of carbon tetrachloride was added, with vigorous stirring, to a solution of 10.4 grams of polystyrene (having an average molecular weight of about 48,000) in 300 cc. of carbon tetrachloride while maintaining the mixture at room temperature or slightly above. Polystyrene sulphonate was thereby formed and precipitated in finely divided form. Ammonia was bubbled through the mixture, after which the sulphonated polystyrene product was removed by filtration and dried. The product was readily soluble in water. A solution of 2 per cent by weight of the polystyrene sulphonate in water was found to have a viscosity of 4807 centistokes at 25° C. and a pH value of 1.45.

EXAMPLE 3

A solution of 16 grams (0.2 mole) of sulphur trioxide in 100 cc. of carbon tetrachloride was added, with vigorous stirring to a solution of 10.4 grams of polystyrene (having an average molecular weight of 60,000) in 500 cc. of carbon tetrachloride while maintaining the reaction mixture at room temperature or thereabout. Ammonia was bubbled through the resultant slurry of sulphonated polystyrene. The sulphonated polystyrene was then separated from the mixture by filtration and dried. It was readily and completely soluble in water. A solution containing 1 per cent by weight of the polystyrene sulphonate in water had a viscosity of 58 centistokes at 25° C. and a pH value of 2.

EXAMPLE 4

In each of two experiments, a solution of sulphur trioxide in 100 cc. of carbon tetrachloride was added with vigorous stirring to a solution of 10.4 grams of polystyrene (having an average molecular weight of 15,000) in 200 cc. of carbon tetrachloride while maintaining the mixture at room temperature or thereabout. The experiments differed from one another as to the proportion of sulphur trioxide employed, i. e. only 4 grams (0.05 mole) of sulphur trioxide was used in one experiment, whereas 16 grams (0.2 mole) of sulphur trioxide was used in the other. In each experiment, the sulphur trioxide reacted rapidly with the polystyrene to form a precipitate of sulphonated polystyrene. Each reacted mixture was saturated with gaseous ammonia and then filtered to separate the sulphonated polystyrene product. Each product, when dried, was in the form of a white, or nearly white, powder. Five parts by weight of each product was admixed with 95 parts of water. The polystyrene sulphonate formed by use of only 0.05 mole of sulphur trioxide was insoluble in the water. The polystyrene sulphonate formed by use of 0.2 mole of sulphur trioxide dissolved readily in the water to form a solution having a viscosity of 8.8 centistokes at 25° C. and a pH value of 1.05.

EXAMPLE 5

A solution of 130 grams of polystyrene (having an average molecular weight of about 26,000) in 6.25 liters of carbon tetrachloride was circulated, by means of a centrifugal pump, from a storage vessel through a reaction coil and back into the vessel. Approximately 120 grams (1.5 moles) of sulphur trioxide was heated to vaporize the same, and the vapors were diluted with about 6 times their volume of dry nitrogen. The vapor mixture was fed into the reaction coil at a point on the inlet side of the pump used for circulating the reaction mixture. While feeding the vapor mixture into the reaction coil, the later was cooled sufficiently to maintain the reaction mixture at temperatures between 26° and 30° C. After feeding all of the sulphur trioxide to the reaction, the mixture, which was a slurry of fine particles of sulphonated polystyrene, was removed from the reaction system and saturated with gaseous ammonia. The mixture was then filtered to separate the polystyrene sulphonate and the latter was dried. The polystyrene sulphonate was obtained as a nearly white powder which was soluble in water. A 2 per cent by weight solution of the product in water had a viscosity of 33.9 centistokes at 25° C. and a pH value of 4.4.

EXAMPLE 6

A solution of 104 grams of polystyrene (having an average molecular weight of 36,000) in 5 liters of carbon tetrachloride was circulated in a tubular reaction system and a vapor mixture of 100 grams (1.25 moles) of sulphur trioxide and approximately 6 times its volume of dry nitrogen was fed into the circulating liquor while maintaining the latter at temperatures of from 17° to 24° C. The time over which the sulphur trioxide was fed to the reaction was 50 minutes. After adding the sulphur trioxide, circulation of the mixture was continued for 5 minutes. The resultant slurry of sulphonated polystyrene was removed from the reaction system, treated with gaseous ammonia until saturated therewith, and filtered to separate the polystyrene sulphonate product. The latter was dried. It was obtained as a nearly white powder which was readily soluble in water. An aqueous solution of the polystyrene sulphonate, containing 2 per cent by weight of the latter, had a viscosity of 97.2 centistokes at 25° C. and a pH value of 3.9.

EXAMPLE 7

This example describes the sulphonation of a solid polymer of ar-vinyltoluene, which polymer, when dissolved in 9 times its weight of toluene, formed a solution having a viscosity of 28 centipoises at 25° C. A solution of 16 grams (0.2 mole) of sulphur trioxide in 100 cc. of carbon tetrachloride was added with vigorous stirring to a solution of 10.4 grams of said polymer in 300 cc. of carbon tetrachloride while maintaining the mixture at room temperature or thereabout. The polymer was thereby sulphonated and the product precipitated in finely divided form. The mixture was then saturated with ammonia and filtered to separate the sulphonated polymer product. The product was dried. It was obtained as a white powder which was soluble in water. A 2 per cent by weight solution of the product in water had a viscosity of 94.6 centistokes at 25° C. and a pH value or 2.25.

EXAMPLE 8

A solution of 10 grams of sulphur trioxide in 100 cc. of carbon tetrachloride was added in about 15 minutes to a solution of 10.4 grams of a solid polymer of ar-chlorostyrene in 300 cc. of carbon tetrachloride while vigorously stirring and maintaining the mixture at temperatures between 20° and 30° C. The sulphonation occurred rapidly and the sulphonated polymer precipitated as small particles. The mixture was then saturated with gaseous ammonia and filtered to separate the sulphonated polymer product, which was dried. The sulphonated polymer was obtained as a nearly white powder which was readily soluble in water. A portion of the product was dissolved in water to form a 2 per cent by weight solution thereof. This solution had a viscosity of 8.6 centistokes at 25° C. and a pH value of 2.45. Other portions of the product were dissolved in water to form a solution of 5 per cent concentration and another solution of 10 per cent concentration. The solution containing 5 per cent by weight of the product had a viscosity of 16.6 centistokes at 25° C. The solution containing 10 per cent of the product had a viscosity of 46.2 centistokes at 25° C.

EXAMPLE 9

This example illustrates the sulphonation of a solid copolymeric material obtained by copolymerizing equal parts by weight of styrene and a C-5 fraction of cracked-oil gas (which C-5 fraction was composed of about 60 per cent by weight of 1-pentene; 15 per cent of pentanes; 15 per cent of conjugated diolefines having 5 carbon atoms in the molecule, i. e. isoprene and piperylene— 5 per cent of cyclopentadiene; and 5 per cent of 1,4-pentadiene). A solution of 10 grams of sulphur trioxide in 100 cc. of carbon tetrachloride was added, in a 15 minute period, to a solution of 10.4 grams of said copolymeric material in 300 cc. of carbon tetrachloride while vigorously stirring and maintaining the mixture at temperatures between 20° and 30° C. The copolymer was thereby sulphonated with formation of a finely divided precipitate of the copolymer sulphonate. The mixture was saturated with gaseous ammonia and filtered to separate the product. The latter was dried. The product was obtained as a nearly white powder that was readily soluble in water. An aqueous solution of the product, in a 2 per cent by weight concentration, had a viscosity of 1 centistoke at 25° C. and a pH value of 2.6. An aqueous solution of the product, in 10 per cent concentration, had a viscosity of 1.4 centistokes at 25° C.

EXAMPLE 10

This example illustrates the sulphonation of a series of copolymers of styrene and ar-vinyltoluene having varying proportions of the latter chemically combined therein. In each of a series of experiments, a solution of 12 grams of sulphur trioxide in 100 cc. of carbon tetrachloride was added, with vigorous stirring, over a period of about 10 minutes to a solution, in 400 cc. of carbon tetrachloride, of the kind and amount of a styrene vinyltoluene copolymer set forth in the following table. The reaction mixture was maintained at temperatures between 20° and 30° C. during the addition. The sulphonation occurred very rapidly with formation of a slurry of the sulphonated copolymer product in finely divided form. Gaseous ammonia was passed into the slurry to saturate the latter. The slurry was then filtered to separate the sulphonated copolymer and the latter was dried. Each product was obtained as a nearly white powder which was readily soluble in water. Separate portions of each product were dissolved in water to form aqueous solutions containing 2 per cent and 5 per cent by weight of the product, respectively. The viscosity, in centistokes at 25° C., of each solution was determined. Also, the pH value of the solutions containing the products in 2 per cent concentration were determined. The table identifies each of the styrene-vinyltoluene copolymers by giving the per cent by weight of ar-vinyltoluene chemically combined therein. It also gives the weight in grams of a copolymer employed in each experiment and the properties of the aqueous solutions of sulphonated copolymer products.

Table

| Run No. | Percent of Vinyltoluene in Copolymer | pH of 2% Sol'n of Sulphonated Copolymer | Viscosity of— | |
|---|---|---|---|---|
| | | | 2% Sol'n of Sulphonated Copolymer | 5% Sol'n of Sulphonated Copolymer |
| 1 | 20 | 3.0 | 19.4 | 46.4 |
| 2 | 30 | 3.1 | 15.2 | 33.9 |
| 3 | 40 | 3.0 | 15.0 | 32.3 |

Other modes of applying the principle of the invention may be employed instead of those explained, change being made as regards the method herein disclosed, provided the step or steps stated by any of the following claims or the equivalent of such stated step or steps be employed.

We claim:

1. A method for making a water-soluble sulphonate of an alkenyl aromatic resin, said resin being a benzene-soluble polymer containing in chemically combined form at least 50 per cent by weight of at least one alkenyl aromatic compound having the general formula:

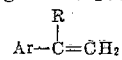

wherein Ar represents a monovalent aromatic radical and R represents a member of the group consisting of hydrogen and the methyl radical, which method comprises admixing from 0.8 to 3 molecular equivalents of sulphur trioxide with a solution of one equivalent weight of the resin in a liquid perchlorinated hydrocarbon to form a mixture containing the liquid perchlorinated hydrocarbon in amount corresponding to at least 9 times the combined weight of the sulphur trioxide and resin starting materials while at the same time maintaining the mixture at reaction temperatures between —20° and 45° C.

2. A method, as claimed in claim 1, wherein a solution of the sulphur trioxide in a portion of the liquid perchlorinated hydrocarbon is added gradually and with stirring to the solution of the resin in another portion of the liquid perchlorinated hydrocarbon.

3. A method, as claimed in claim 1, wherein the sulphur trioxide is fed as a vapor into admixture with the solution of the resin in the liquid perchlorinated hydrocarbon.

4. A method, as claimed in claim 1, wherein the sulphur trioxide and the solution of the resin in a liquid perchlorinated hydrocarbon are caused to flow into admixture with one another in proportions of from 0.8 to 3 molecular equivalents of the sulphur trioxide per equivalent weight of the resin.

5. A method, as claimed in claim 1, wherein the resin is a polymer of an alkenyl aromatic compound having the general formula:

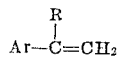

wherein Ar represents a monovalent aromatic radical and R represents a member of the group consisting of hydrogen and the methyl radical.

6. A method for making a water-soluble sulphonate of an alkenyl aromatic resin, said resin being a benzene-soluble polymer containing in chemically combined form at least 50 per cent by weight of at least one alkenyl aromatic compound having the general formula:

$$\mathrm{Ar-\underset{\underset{R}{|}}{C}=CH_2}$$

wherein Ar represents a monovalent aromatic radical and R represents a member of the group consisting of hydrogen and the methyl radical, which method comprises admixing from 1 to 2 molecular equivalents of sulphur trioxide with a solution of one equivalent weight of an alkenyl aromatic resin in a liquid perchlorinated hydrocarbon to form a mixture containing the liquid perchlorinated hydrocarbon in amount corresponding to between 9 and 200 times the combined weight of the sulphur trioxide and the resin while at the same time maintaining the mixture at reaction temperatures between 0° and 35° C., whereby a water-soluble sulphonate of the resin is formed and precipitated, and separating the resin sulphonate from the reaction mixture.

7. A method, as claimed in claim 6, wherein the resin is a polymer of an alkenyl aromatic compound having the general formula:

$$\mathrm{Ar-\underset{\underset{R}{|}}{C}=CH_2}$$

wherein Ar represents a monovalent aromatic radical and R represents a member of the group consisting of hydrogen and the methyl radical.

8. A method, as claimed in claim 6, wherein the alkenyl aromatic resin is polystyrene.

9. A method, as claimed in claim 6, wherein the alkenyl aromatic resin is a polymer of ar-vinyltoluene.

ARTHUR S. TEOT.
GLENN C. WIGGINS.

No references cited.